United States Patent Office 3,458,274
Patented July 29, 1969

3,458,274
RETARDING WATER EVAPORATION FROM STORAGE RESERVOIRS
Edward P. Cashman, Bayonne, N.J., and Nicholas M. Schneider, Bethel Park, Pa., assignors to Esso Research and Engineering Company, a corporation of Delaware
No drawing. Filed Apr. 20, 1967, Ser. No. 632,197
Int. Cl. B01j 1/18
U.S. Cl. 21—60.5      11 Claims

ABSTRACT OF THE DISCLOSURE

To reduce water loss by evaporation from a reservoir of water having a surface exposed to the atmosphere, there is applied to the surface a film of a paraffin wax composition consisting essentially of 25–90 wt. percent of a paraffin wax having a melting point within the range of 85 to 100° F. and from 75 to 10 wt. percent of a hydrocarbon oil having a viscosity within the range of 50 to 400 SUS at 100° F., said composition having a solid point in the range of about 65 to 90° F.

DESCRIPTION OF THE INVENTION

This invention concerns a method for conserving water that is stored in open reservoirs by retarding evaporation from the surface thereof. More particularly, the invention concerns the provision of a novel composition of matter that is capable of spreading over the surface of a body of water to form a film thereon which acts as a barrier to prevent or retard loss of water by evaporation.

In many geographic areas, particularly in arid or semiarid regions where adequate sources of water are limited, conservation of water is of major importance. Also, in many areas that are not generally regarded as arid or semiarid, there are often extended periods of drought when rainfall is considerably below normal, during which periods of time it becomes important to conserve the water supply. One serious source of loss, particularly during the summer months, is loss by evaporation.

In recent years, investigation of water conservation measures has led to the use of monolayers of various materials as, for example, long chain fatty alcohols, particularly acetyl alcohol or stearyl alcohol or mixtures of those alcohols. These higher alcohols are spread over the surface of the water and form a substantially continuous film which will retard water evaporation. Because of bacterial action and other factors, the use of the higher alcohols has not been entirely satisfactory. It has been more recently found that a blend of a natural or petroleum wax, a mineral oil, and a hydrocarbon solvent can be used for this purpose as taught in U.S. Patent 3,095,263. Briefly, the composition disclosed in that patent consists of a wax having a melting point of from about 115° to 300° F., a mineral oil having a viscosity of from 40 to 100 SUS at 100° F., and a hydrocarbon solvent boiling within the range of from 90 to 700° F.

It has now been found in accordance with the present invention that a still more effective composition for preventing water evaporation by forming a film on the surface of a reservoir can be prepared by blending a paraffin wax having a melting point within the range of 85° to 110° F., and more advantageously within the range of about 95° to 105° F. with a sufficient proportion of a highly refined mineral oil so that the blend of wax and oil has a solid point in the narrow range of from about 65 to 90° F., e.g., 75° F., or 85° F., this solid point being selected so that it is below the maximum day time temperature and higher than the minimum night time temperature for the period of the year in which it is being used. Thus, the proper blend of wax and oil will solidify during the night time and remelt during the day time, which permits the body of water to breathe. If the film remains permanent and does not break up periodically, the body of water cannot be areated; thus plant and animal life within the reservoir will die and the water will not have an acceptable taste.

To facilitate the spreading of the film, the blend of wax and oil can be dissolved initially in a low-boiling solvent before it is added to the water reservoir. Enough solvent is used so that the melting point of the resulting solution is well below the temperature of the reservoir water, thus permitting the solution to spread over the water and form a uniform thin film. Substantially all of the solvent evaporates and leaves a thin film of wax and oil blend to accomplish the desired retardation of water evaporation. The use of solvent to aid in spreading the film is not necessary, as the blend of wax and oil can be applied in a molten state and will spread by the action of the sun and the day time temperature.

The rate of application of the wax composition will be dictated to some extent by economics, since it would be wasteful to use more wax than necessary to produce the desired evaporation reduction. In general, the wax composition will be applied to the water surface at a rate within the range of about 50 to 400 pounds per acre of surface, or more usually at a rate within the range of about 75 to 200 pounds per acre.

The paraffin waxes used in the practice of this invention can have melting points in the range of 85 to 110° F., but will more advantageously have melting points in the range of 95 to 105° F. Waxes in these melting point ranges can be obtained by suitable fractionation of crystalline paraffin waxes of 115 to 140° F. melting point. Crystalline paraffin waxes obtained from petroleum oils are well known. Crystalline paraffin waxes are usually obtained from the so-called paraffin distillates which are produced as the overhead fraction when distilling a topped crude oil in a vacuum pipestill. In such an operation the waxy oil is fractionated into the overhead or paraffin distillate, a heavy lubricating oil distillate sidestream, and a residual fraction. The overhead distillate may have a boiling range of from about 580° to about 850° F., while the lubricating oil distillate sidestream may have a boiling range of about 800 to about 1000° F.

The fractions thus produced are generally dewaxed separately by chilling the oil in the presence of a solvent to crystallize the wax and then separating the wax and oil by filtration or centrifugation. The solvent aids in formation of the wax crystals and reduces the oil viscosity so that rapid separation is possible. Suitable solvents for this purpose include liquefied normally gaseous hydrocarbons such as propane, butane, hexane and the like and aliphatic ketones containing from 3 to 6 carbon atoms, such as methyl ethyl ketone, diethyl ketone, methyl propyl ketone, ethyl propyl ketone, and methyl isobutyl ketone. The lower molecular weight ketones may be used in conjunction with an aromatic solvent such as benzene or toluene. A particularly effective solvent comprises about 50 to 75 volume percent methyl ethyl ketone and about 25 to 50 volume percent of toluene. Following chilling of the oil in the presence of such a solvent, the wax crystals formed are separated from the oil-solvent mixture by centrifugation or by means of rotary filters, plate and frame filter presses or the like. Such dewaxing processes are widely used throughout the petroleum industry and will be familiar to those skilled in the art.

The wax obtained when the overhead fraction of the vacuum still is dewaxed is characterized by large well-defined crystals that can be readily separated from the oil.

These waxes have melting points in the general range of about 115 to about 150° F. The wax as recovered from the dewaxing step generally contains from about 3 to 40% of oil and is referred to as slack wax. The oil content of the slack wax can be reduced to 0.5 wt. percent or less, e.g. below about 0.3 wt. percent, by various procedures including a conventional sweating operation, recrystallization, or solvent deoiling. This involves dissolving the wax in such solvents as methyl isobutyl ketone, methyl ethyl ketone, or mixtures of methyl ethyl ketone and toluene in a ratio of approximately 75 to 25, respectively. The wax solution is cooled to produce crystallization and the crystallized wax is removed by a process such as filtration. The filter cake of crystallized wax may be washed with cold solvent to remove occluded oil solution. The wax so produced may be an unfinished refined paraffin wax or an unfinished microcrystalline wax, depending on the nature of the slack wax feed, and on the selection of crystallization conditions. After oil removal from the wax, the latter is subjected to a finishing process such as clay percolation or hydrofining. The hydrofining process involves treating the unfinished wax with hydrogen gas at a rate of about 0.5 to 1.0 volume of wax per hour, at 500 to 800 p.s.i., at 500 to 600° F., in contact with a catalyst such as cobalt molybdate. At lower pressures such as 200 p.s.i., a nickel catalyst may be used. The hydrogen-treated wax product is greatly improved with respect to color, odor and purity.

To prepare waxes for use in the present invention, a wax obtained from paraffin distillates having a melting point in the range of from about 115 to about 140° F. can be subjected to fractionation in a vacuum still and an overhead cut of the desired melting point can be recovered. For example, a 122° M.P. wax can be thus treated to give an overhead fraction of 108° F. melting point. Also, one can use the 108° F. melting point wax and subject it to vacuum distillation and get overhead 20 to 25% of a 100° M.P. wax. Another source of the relatively low melting point waxes is the low melting point microcrystalline waxes which are obtainable from a reduced crude oil by the procedures taught in U.S. Patent 2,661,318.

The hydrocarbon oil with which the low melting point wax is blended in accordance with the present invention will have a viscosity in the range of about 50 to 400 SUS at 100° F., and preferably a viscosity in the range of about 50 to 250 SUS at 100° F., and will be selected to have adequate solubility for the wax being employed. It is particularly preferred, when the wax blend is to be used on a reservoir storing a municipal water supply, to employ a highly refined oil known as a white oil, e.g., one having a viscosity of 70 or 90 SUS at 100° F. Such oils are well known in the art and are usually prepared by treating a petroleum oil of the desired viscosity with fuming sulfuric acid, usually in the proportion of about 2 to about 8 pounds of acid per gallon of oil. Particularly preferred are mineral white oils of 60 to 200 SUS viscosity at 100° F., which will give a color not greater than 3 N.P.A. by the U.S.P. Acid Test, which consists of heating 5 cc. of oil and 5 cc. of chemically pure sulfuric acid in a glass-stoppered cylinder for 10 minutes in a water bath and shaking at 30-second intervals. To pass this test the oil must remain colorless and the acid must not become darker than pale amber.

In preparing the blends of wax and hydrocarbon oil, the proportions will vary from in the range of from 25 wt. percent of wax and 75% of oil to 90 wt. percent of wax and 10 wt. percent of oil, or more preferably in the range of from 40 to 70 parts of wax and 60 to 30 parts of oil. The wax-oil compositions are applied to the surface of the water reservoir at the rate of about 50 to 400 pounds per acre, or preferably at a rate in the range of about 75 to 200 pounds per acre. These amounts are exclusive of any solvent that may be used. If a solvent is used to aid in spreading the wax-oil blend, it will not exceed an amount equal to the amount of the oil-wax blend. In other words, compositions comprising 50 to 100% of oil-wax blend and 0 to 50% solvent are included in this invention.

The solvents that can be employed in the present invention for improving the initial spreadability of the oil-wax compositions will, in general, have boiling points or boiling ranges within the range of about 100 to 500° F., or more preferably in the range of about 140 to about 400° F. Thus, suitable hydrocarbon solvents include pentane, hexane, heptane, decane, and the like or narrow fractions of petroleum distillates as, for example, a naphtha boiling in the range of from about 315 to 400° F. Where the composition is to be employed in a reservoir for a municipal water supply, and it is decided to employ a solvent to assist in spreadability of the composition, it is preferred to use a highly refined and highly isoparaffinic solvent comprising a mixture of synthetic hydrocarbons obtained, for example, from alkylation and fractionation processes as, for example, from an alkylation reaction involving isobutane and an olefin of from 3 to 5 carbon atoms. The isoparaffinic solvent will contain at least 50 volume percent isoparaffins, preferably at least 75 volume percent of isoparaffins, and more preferably at least 90 volume percent of isoparaffins.

The preferred isoparaffinic hydrocarbon compositions are those wherein the contents of unsaturated hydrocarbons, such as aromatics and olefins are less than about 1%, and more preferably less than 0.1% by weight, wherein the contents of cyclo paraffins and normal paraffins are less than 10%, and preferably less than about 5% by weight, and wherein the total concentrations of non-hydrocarbon impurities such as peroxides, acids, carbonyls, alcohols or other oxygenated compounds are below about 0.01% by weight, and preferably below 0.001% by weight. In ultimate analysis, the contents of all other elements, particularly S, N and Cl, must be less than 0.0005% by weight.

These highly isoparaffinic compositions can be secured by distilling an alkylate, which is made by reaction between isobutane and olefin of 3 to 5 carbon atoms, to secure the desired boiling range. The desired cut can be hydrofined and then treated with caustic and adsorbents such as silica gel, alumina, activated char or zeolite to secure the desired purity. These highly isoparaffinic, highly purified fractions may also be secured by the hydrogenation of unsaturated branched olefins of the appropriate boiling range. Isoparaffins constituting this solvent include chiefly tetramethyl hexanes, tetramethyl heptanes and tetramethyl octanes, such as 2,2,4,4-tetramethyl hexane, 2,3,3,5-tetramethyl heptane and 2,2,4,6-tetramethyl octane. A representative isoparaffinic solvent for use in the present invention has the following typical inspection:

Distillation (° F.):
    IBP _____ 348
    5% _____ 350
    10% _____ 351
    50% _____ 356
    90% _____ 364
    95% _____ 368
    Dry point _____ 370
    FBP _____ 376
Flash, Tag C.C., ° F. _____ 125
Hydrocarbon types (Volume percent):
    Total paraffins _____ 93.8
    1 ring naphthenes _____ 5.9
    2 ring naphthenes _____ 0.1
    Aromatics _____ 0.2
Kauri butanol value _____ 27.3

The nature of this invention and the manner in which it can be practiced will be better understood when reference is made to the following examples which include a preferred embodiment.

EXAMPLE 1

A series of evaporation tests were conducted wherein open glass containers of 2000 ml. capacity with a water surface area of 20 sq. in. were employed as reservoirs. In each case the water reservoir was filled with water and then a covering consisting of a wax composition dissolved in light petroleum solvent was placed on the experimental reservoir. Each solution consisted of 70 wt. percent of wax or wax-oil blend and 30 wt. percent of isoctane. Each wax composition was applied to the surface of the water at a rate equilvalent to 345 pounds of wax composition per acre (ex solvent). A control reservoir was also used wherein there was no covering of a wax film. The reservoirs were placed in the open air. They were subjected to summertime ambient weather conditions including rain, sunshine, wind, dust, and so forth. Each of the reservoirs was weighed at the end of 7 days and at the end of 15 days and the water loss was calculated in gallons per acre per day. In one case, a paraffin wax of 100° F. melting point from San Joaquin crude was employed, being applied as a 50 wt. percent solution in isoctane. In a second case a wax blend of 82° F. melting point was used, this wax having been prepared by blending 50 wt. percent of the 100° F. melting point wax with 50 wt. percent of a petroleum white oil, which was an acid-treated oil having a viscosity of 100 SUS at 100° F. The results obtained with these two wax blends in comparison with an untreated reservoir are given in Table I:

TABLE I.—GALLONS WATER LOSS PER ACRE PER DAY

| Total time interval, days | No wax | 100° F. wax | 82° F. wax blend |
|---|---|---|---|
| 7 | 17,500 | 16,500 | 60 |
| 15 | 15,000 | 13,800 | 80 |

It will be seen from the data in Table I that the wax blend having a melting point of 82° F. was extremely more effective than the 100° F. melting point wax in reducing the evaporation loss from the reservoir.

EXAMPLE 2

Using the same procedure and the same type of reservoirs as were used in Example 1, the 82° F. melting point blend of 100° melting point wax and white oil of Example 1 was compared with cetyl alcohol. Each of these materials was applied as a 70 wt. percent solution in isooctane to a test reservoir at a rate equivalent to 138 pounds of wax-oil blend (ex solvent) per acre. The reservoirs were weighed weekly and the water loss or gain was calculated in gallons per acre per day. The results obtained are given in Table II. Each of the values is an average for the week in question and does not constitute a cumulative value.

TABLE II.—GALLONS WATER LOSS PER ACRE PER DAY

|  | No wax | Cetyl alcohol | 82° F. wax blend |
|---|---|---|---|
| First week | 14,300 | 4,900 | 1,100 gain. |
| Second week | 2,800 | 2,400 | 2,600 gain. |
| Third week | 2,320 | 2,020 | 550 gain. |
| Fourth week | 13,000 | 11,400 | 7,800 loss. |

The results in Table II show that the 82° F. melting point wax was more effective than cetyl alcohol in preventing loss by evaporation. The data also show that after four weeks the wax covering was still effective in preventing water evaporation, whereas the cetyl alcohol lost much of its effectiveness after one week.

EXAMPLE 3

Again following the same procedure as in Example 1, comparative tests were made using in one case a blend (96° F. solid point) of 50 wt. percent of a 115° F. melting point wax and 50 wt. percent of mineral white oil of about 100 SSU at 100° F. and using in a second case the blend (82° F. solid point) of 50% of 100° F. melting point wax and 50% mineral white oil described in Examples 1 and 2. Each blend was applied as a 70 wt. percent solution in isooctane, as in Example 1, the application rate being 138 pounds of wax-oil composition per acre, (ex solvent). Water lost or gained was determined over a four-week period as in Example 2. The results obtained are given in Table III.

TABLE III.—WATER LOSS, GALLONS PER ACRE PER DAY

|  | No film | 115° F. wax | 100° F. wax |
|---|---|---|---|
| First week | 6,050 | 2,950 | 1,310 |
| Second week | 5,380 | 4,100 | 3,800 |
| Third week | 2,890 | (+1,950) | (+2,300) |
| Fourth week | 4,340 | 4,140 | 2,140 |

It will be seen that the blend using the 100° F. melting point wax was superior to the blend using the 115° F. melting point wax in preventing loss of water by evaporation.

EXAMPLE 4

To demonstrate the effect of using 100° F. melting point wax in place of 115° F. melting point wax, each of these waxes was blended with sufficient white oil of 90 SUS viscosity at 100° F. to give a blend having a solid point of about 82° F. This required a ratio of 27 parts by weight of 115° F. M.P. wax to 73 parts of the white oil, and 50 parts each of 100° F. M.P. wax to 50 parts of the white oil, respectively. As in Example 1, the water reservoirs were open glass containers of 2000 ml. capacity having a water surface area of 20 square inches. The blends were spread on the surface of the water by melting the blends rather than by use of solvent. Rate of application of the film was on the basis of 138 pounds per acre. The containers were placed in a laboratory hood in which the draft was applied continually night and day for four weeks, thus causing a continuous slight breeze over the surface. A 250 watt sunlamp was placed 12 inches from the surface of the water of each container and turned on for eight hours per day for five days per week, thus simulating the alternate daily heating and cooling effect that would result from daytime exposure to the sun and lack of such exposure at night. At the end of each week, water loss was measured by weighing each container and its contents and comparing the measured weight with the original weight. Water was then added to restore the original weight and the test was continued for additional one-week periods until four weeks had elapsed. The results obtained, which are on a weekly basis, and not on a cumulative basis, are given in Table IV, which follows. Differences from week to week are undoubtedly explained by changes in room temperature, variations in efficiency of the draft through the laboratory hood, etc. Obviously, whatever those changes were, all three reservoirs were equally subjected to them, so that the comparative tests were all on the same basis. It will be noted that in each of the weekly tests the blend prepared from the 100° F. melting point wax was more effective than the 115° F. melting point wax in reducing evaporation losses.

TABLE IV.—WATER LOSS, GALLONS PER ACRE PER DAY

|  | No film | 115° F. wax | 100° F. wax |
|---|---|---|---|
| First week | 8,250 | 3,860 | 3,690 |
| Second week | 4,820 | 2,230 | 1,740 |
| Third week | 10,400 | 3,670 | 3,540 |
| Fourth week | 10,400 | 3,760 | 3,150 |

EXAMPLE 5

The effect of using a wax film in accordance with the present invention was determined on a large swimming pool measuring 65 feet by 180 feet, giving a water surface of 0.27 acre. The test was run for a period of 30 days. During the first 15 days no film was applied. Total rainfall during this period was 2.12 inches and evaporation of water from the pool totaled 1.87 inches, which was equivalent to a water loss of 3,380 gallons/acre/day. Water temperature averaged about 56° F. During the next 15 days the pool was covered with a film of wax prepared by blending 35 parts by weight of 100° F. M.P. paraffin wax with 65 parts by weight of refined white oil of 90 SUS viscosity (at 100° F.). The resulting blend had a melting point of 74° F. It was applied by dissolving 37 parts by weight of the blend in 12 parts by weight of an isoparaffinic hydrocarbon solvent of 240° F. initial boiling point, 290° F. dry point, and 0.72 specific gravity. The content of aromatic hydrocarbons in this solvent did not exceed 0.1 wt. percent, and the sulfur content did not exceed 10 p.p.m. The wax solution was applied to the pool surface at the rate of 138 pounds of oil-wax blend (ex solvent) per acre of water surface. Rainfall during this period amounted to 0.19 inch, and water evaporation amounted to 0.87 inch, equivalent to 1,570 gallons/acre/day. Average water temperature was 54° F. Thus, by using the wax film the water saving amounted to 1,810 per acre per day. During the test it was noted that the film went solid in small particles overnight, but respread over the water surface on a sunny day.

What is claimed is:

1. A method for reducing water loss from a reservoir of water having a surface exposed to the atmosphere which comprises applying to said surface a film of a wax composition consisting essentially of from 25 to 90 wt. percent of a paraffin wax having a melting point within the range of 85 to 110° F. and from 75 to 10 wt. percent of a hydrocarbon oil having a viscosity within the range of from 50 to 400 SUS at 100° F., said wax composition having a solid point selected so as to be higher than the minimum night time temperature and lower than the maximum day time temperature for the period in which it is used.

2. Method as defined by claim 1 wherein said solid point is within the range of about 65 to 90° F.

3. Method as defined by claim 1 wherein said hydrocarbon oil is a petroleum white oil.

4. Method as defined by claim 1 wherein said paraffin wax has a melting point within the range of 90 to 105° F.

5. Method as defined by claim 1 wherein said wax composition is applied as a solution in a hydrocarbon solvent boiling within the range of from 100 to 500° F.

6. Method as defined by claim 5 wherein said solvent contains at least 50 wt. percent of isoparaffins.

7. A film forming composition consisting essentially of from 25 to 90 wt. percent of a paraffin wax having a melting point in the range of 85 to 110° F. and from 75 to 10 wt. percent of a hydrocarbon oil having a viscosity in the range of from 50 to 400 SUS at 100° F., said composition having a solid point in the range of from 65 to 90° F.

8. Composition as defined by claim 7 wherein said paraffin wax has a melting point in the range of about 95 to 105° F.

9. Composition as defined by claim 7 wherein said hydrocarbon oil has a viscosity in the range of about 60 to 250 SUS at 100° F.

10. Composition as defined by claim 7 wherein said hydrocarbon oil is a petroleum white oil.

11. Composition as defined by claim 7 which is dissolved in up to an equal weight of a hydrocarbon solvent boiling in the range of from 100 to 500° F.

References Cited

UNITED STATES PATENTS 3,095,263   6/1963   Eckert et al. _____ 21—60.5

MORRIS O. WOLK, Primary Examiner

B. S. RICHMAN, Assistant Examiner

U.S. Cl. X.R.

252—351, 384